United States Patent Office 3,766,302
Patented Oct. 16, 1973

3,766,302
NOVEL BIS-IMIDE COMPOSITIONS AND
POLYMERS THEREFROM
Fred F. Holub, Schenectady, and Carl M. Emerick,
Mechanicville, N.Y., assignors to General Electric
Company
No Drawing. Original application Apr. 25, 1969, Ser. No.
819,430, now Patent No. 3,651,012. Divided and this
application June 3, 1971, Ser. No. 149,802
Int. Cl. C08f 15/06; C08g 20/20
U.S. Cl. 260—884         3 Claims

ABSTRACT OF THE DISCLOSURE

The invention covers novel imide compositions, and coreaction products of the latter with copolymerizable monomers and various polymers and resins. The compositions herein described have many uses including insulation and protective applications as well as being useful in numerous molding applications.

---

This application is a division of application Ser. No. 819,430, filed Apr. 25, 1969, now U.S. 3,651,012, and assigned to the same assignee as the present application.

This invention is concerned with novel bis-imide compositions and polymers and copolymers therefrom. More particularly, the invention is concerned with a composition of matter having the general formula I
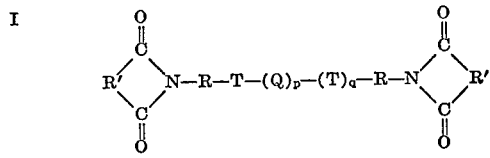

where R is a divalent alkylene radical of from 1 to 10 carbon atoms or an arylene radical of from 6 to 20 carbon atoms, preferably selected from the class consisting of the arylene (e.g., phenylene) and hydrocarbon-substituted arylene (e.g., phenylene) radicals, e.g., alkyl-substituted phenylene radicals (e.g., methyl, ethyl, propyl, etc., substituted phenylene radicals) and aryl-substituted (e.g., phenyl, tolyl, etc., substituted phenylene radicals) arylene radicals, where the number of substituents on the arylene radical may range from 1 to 4, R' is a member selected from the class consisting of the II

III
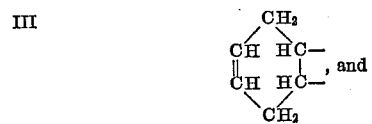

IV
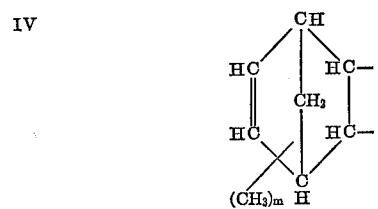

groupings, and halogenated derivatives of R', particularly halogenated derivatives of groupings identified by Formulas III and IV, T is a member of the class of groupings selected from

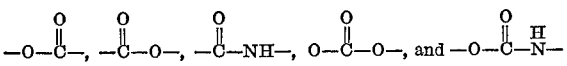

and Q is a divalent organic radical of at least two to as high as 50 or more carbon atoms, preferably selected from but not limited to the class of aromatic, aliphatic, cycloaliphatic, heterocyclic, combinations of aliphatic and aromatic radicals, etc., and substituted hydrocarbon groups thereof, among which may be mentioned phenylene radicals containing from 6 to 12 carbon atoms and the

V        —R″—Z—R″— radical where R″ is selected from the class of phenylene, and halogen-substituted and alkyl-substituted phenylene radicals and Z is a divalent grouping of the class of alkylene radicals of from 1 to 6 carbon atoms,

X is a member selected from the class consisting of hydrogen, halogen, and the methyl radical, and p and q are the same and are 0 or 1, m is 0 or 1, the methyl radical in Formula IV being capable of replacing any hydrogen of the monohydrogen-substituted carbons. It should be understood that the R's of Formula I can be the same or different.

The imides of Formula I can be prepared in different manners depending on the desired composition coming within the scope of Formula I, and also depending, in a number of instances, on whether p and q are 0 or 1, and whether Q is a divalent mononuclear arylene radical or a divalent dinuclear arylene radical as in Formula V. One group of compounds coming within the scope of Formula I can be prepared by effecting reaction between about 2 mols of a compound corresponding to the general formula VI
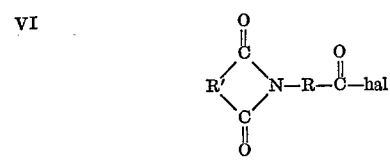

and about 1 mol of a dihydroxy compound corresponding to the formula

VII         HO—Q—OH where R, R', and Q have the meanings above and "hal" is halogen, e.g., chlorine, bromine, fluorine, etc. Alternatively, the reaction may be carried out between 2 mols of a compound having the general formula

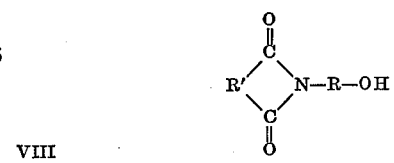

VIII and 1 mol of a composition corresponding to the general formula

I

As a still further alternative, one can form compositions coming within the scope of Formula I by effecting reaction between a mol of a compound of Formula VIII with one mol of a compound of Formula VI. Substitution of the hydroxy group in Formula VIII or in one or both of the hydroxy groups in Formula VII by an amino (—NH₂) group and then reacting the latter with a compound of Formulas VI or IX will yield amide derivatives coming within the scope of Formula I.

As will be apparent to those skilled in the art, the preparation of carbonate derivatives coming within the scope of Formula I can be carried out in numerous ways, but one method which has been particularly effective involves the reaction of, for instance, a composition corresponding to Formula VIII with phosgene or with diphenyl carbonate. More complex carbonate derivatives coming within the scope of Formula I can be obtained by effecting reaction between the general composition of Formula VII and a composition of Formula VIII wherein mixtures of these two compositions are subjected to phosgenation by treating again with either phosgene or diphenyl carbonate.

In making the isocyanato compositions occurring within the scope of Formula I, one can effect reaction between a compound corresponding to the general Formula VIII and a diisocyanato compound of the formula

X        OCN—Q—NCO where Q has the meaning given above and preferably is an arylene radical, for instance, a phenylene radical or hydrocarbon-substituted phenylene radicals. Generally, two mols of the hydroxy compound of Formula VIII per mol of the compound of Formula X is adequate for obtaining the desired composition.

It will be apparent that in discussing the above methods for preparing the various compositions embraced by Formula I, R, R', and Q all have the meanings given above.

Among the members which R in Formula I may represent are, for instance, alkylene radicals, e.g., methylene, ethylene, propylene, isopropylene, butylene, hexylene, decylene, etc., radicals; arylene radicals of from 6 to 20 carbon atoms, e.g., phenylene, biphenylene, naphthylylene, methylphenylene, dimethylphenylene, ethylphenylene, phenyl-substituted phenylene radicals, etc. The presence of halogen, for example chlorine, on the divalent R radical is not precluded. Z can be any of the divalent alkylene radicals recited for R in addition to the other groupings recited for Z.

Among the divalent organic radicals of from 2 to 50 carbon atoms or more which Q may represent are, for instance, the same alkylene radicals as recited for R above with additional examples derived from alkylene radicals containing more than 10 carbon atoms, (for example, dodecylene, tetradecylene, tetracontanylene (—$C_{40}H_{80}$—) etc.; phenylene, biphenylene, cyclohexylene, naphthylylene, methyl-substituted phenylenes of from 1 to 4 methyl groups on the phenylene radical, ethyl phenylene, pyridylidene, the divalent 1,4-pyridine radical, the divalent piperazine radical of the formula

etc. Among the divalent radicals wherein Q is represented by Formula V are, for instance, biphenylene methylene of the formula

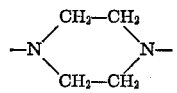

biphenylene oxide, biphenylene sulfone, biphenylene sulfide, keto biphenylene of the formula

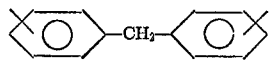

biphenylene isopropylidene of the formula

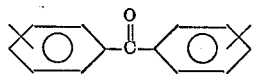 etc.

Obviously, the arylene radicals may be attached to nitrogen through the ortho-, meta- or para-positions of the arylene nucleus.

Typical of the compositions coming under the generic Formula VI which can be used in the practice of the present invention may be mentioned: p-maleimidobenzoyl chloride, p-tetrahydrophthalimidobenzoyl chloride, 2-maleimidoacetyl chloride, endomethylenetetrahydrophthalimidobenzoyl chloride, hexachloroendomethylenetetrahydrophthalimidobenzoyl chloride, tetrachlorotetrahydrophthalimidobenzoyl chloride, etc.

Among the dihydroxy compounds corresponding to the Formula VII may be mentioned, for instance, hydroquinone, 4,4'-dihydroxydiphenyl methane, 3,3'-dihydroxydiphenyl methane, 4,4'-dihydroxydiphenyl propane-2, 4,4'-dihydroxydiphenyl oxide, 4,4'-dihydroxydiphenyl sulfone, etc. It will of course be apparent to those skilled in the art that in place of the arylene derivatives of Formula VII, aliphatic derivatives may also be employed including, for instance, ethylene glycol, diethylene glycol, propylene glycol; 2,6,2',6' - tetramethyldihydroxydiphenyl methane, etc.

Included among the compositions coming within the scope of general Formula VIII which can be employed in the practice of the present invention are, for instance, p-tetrahydrophthalimidophenol, p-maleimidophenol, N-(p-hydroxyphenyl) endomethylenetetrahydrophthalimide, N - hydroxyphenylhexachloroendomethylenetetrahydrophthalimide, etc. Numerous compositions coming within the scope of the general Formula IX which can be employed include, for instance, phthaloyl chloride, terephthaloyl chloride, isophthaloyl chloride, dichlorophthaloyl chloride, 4,4'-bis-chloroformyldiphenyl methane, etc.

In all instances where one of the reactants has a radical of Formulas II, III and IV, it will be apparent that intended within such compositions are those which have the maleimido, methyl maleimido, and halogenomaleimido radicals; citraconic imido radical, tetrahydrophthalimido radical; endromethylenetetrahydrophthalimido, and the methyl-substtituted derivative thereof, and halogenated derivatives of radicals of Formulas III and IV, etc. In each instance, a person skilled in the art will recognize the starting ingredients which are required to make those compositions which come within the scope of Formula I.

When the dihydroxy compound of Formula VII is substituted with one or two amino groups and preferably two amino groups in place of the two hydroxy groups, typical diamino compounds which can be employed for the purpose are, for instance, meta-phenylenediamine;
para-phenylenediamine;
4,4'-diamino-3,5,3',5'-tetramethyl-diphenyl methane;
4,4'-diamino-diphenyl propane;
4,4'-diamino-diphenyl methane;
4,4'-diamino-diphenyl sulfide;
4,4'-diamino-diphenyl sulfone;
3,3'-diamino-diphenyl sulfone;
4,4'-diamino-diphenyl ether;
4,4'-diamino-3,5,3',5'-tetrachloro-diphenyl methane;
2,6-diamino-pyridine;
bis-(4-amino-phenyl)diethyl silane;
bis(4-amino-phenyl)phosphine oxide;
bis-(4-amino-phenyl)-N-methylamine;
1,5-diamino-naphthalene;
3,3'-dimethyl-4,4'-diamino-biphenyl;
3,3'-dimethoxybenzidine;
2,4-bis-(beta-amino-t-butyl)toluene;
bis-(para-beta-amino-t-butylphenyl) ether;
para-bis-(2-methyl-4-amino-pentyl) benzene;
para-bis-(1,1-dimethyl-5-amino-pentyl) benzene;
m-xylylene diamine;
p-xylylene diamine;
bis-(para-amino-cyclohexyl) methane;
hexamethylene diamine;
heptamethylene diamine;
octamethylene diamine;
nonamethylene diamine;
decamethylene diamine;

3-methylheptamethylene diamine;
4,4-dimethylheptamethylene diamine;
2,11-diamino-dodecane;
1,2-bis-(amino-propoxy) ethane;
2,2-dimethyl propylene diamine;
3-methylheptamethylene diamine;
2,5-dimethylhexamethylene diamine;
2,5-dimethylheptamethylene diamine;
5-methylnonamethylene diamine;
1,4-diamino-cyclohexane;
1,12-diamino-octadecane;
$H_2N(CH_2)_3O(CH_2)_2O(CH_2)_3NH_2$;
$H_2N(CH_2)_3S(CH_2)_3NH_2$;
$H_2N(CH_2)_3N(CH_3)(CH_2)_3NH_2$;

and mixtures thereof.

Typical of the isocyanato compounds which can be employed under Formula X are, for example, 1,4-phenylene diisocyanate, tolylene diisocyanate, biphenylene diisocyanate, hexamethylene diisocyanate, etc. The positions of the isocyanato groups on the arylene nucleus can be varied widely and may be ortho, meta, or para to each other, or vicinal, symmetrical or asymmetrical with regard to other substituents, e.g., alkyl groups, on the arylene nucleus.

As pointed out above, the reactants, whereby the compositions of Formula I can be prepared, can be used in various molar ratios depending on the type of ultimate composition desired. In some respects the molar ratio of the reactants will depend on the meanings assigned to T and Q, and the values assigned to $p$ and $q$. For instance, if one should desire to make compositions corresponding to the general formula XI 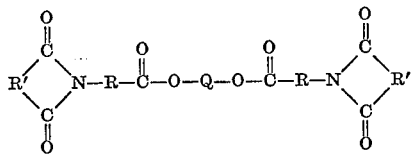

obviously one would react about 2 mols of the composition corresponding to Formula VI with about 1 mol of a composition corresponding to Formula VII; variations in the molar concentrations may be, for example, from about 1.5 to 3 mols of compositions of the general Formula VI per mol of the dihydroxy compound of Formula VII. However, if one were desirous of making compositions of the general formula XII 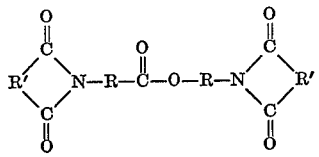

one of cource would react an ingredient corresponding to the general Formula VI with an ingredient corresponding to general Formula VIII; in this respect, the molar ratios would be approximately 1 mol of each of the reactants.

Persons skilled in the art will have no difficulty in determining the molar concentrations employed since generally it will be self-evident from an examination of the desired ultimate composition. The examples appended hereto furnish additional disclosures and teachings for making the various compositions coming within the scope of the general Formula I.

Advantageously, the reaction between the ingredients is carried out in the presence of an inert solvent, for instance, dimethyl formamide, N-methyl-2-pyrrolidone, tetrachloroethane, chlorinated biphenyl and chlorinated diphenyl oxide, etc. The amount of solvent used should be sufficient to efficiently dissolve the reactants and should have a high enough boiling point so that conveniently the reaction can be carried out at atmospheric pressure at the elevated temperatures which are usually employed for the purpose.

In general, the mixture of ingredients is heated at a temperature ranging from about 50° C. to about 200° C. for a time varying from about 2 minutes to about 4 hours or more until such time as completion of the reaction is achieved. For convenience, the reaction may be carried out under an inert atmosphere, for instance, under a nitrogen atmosphere and additionally, provision is made for removal of the hydrogen halide which evolves in many of the reactions as a result of the intereaction of the two ingredients. Generally, under such conditions, completion of the reaction can be determined by cessation of the evolution of hydrogen halide. Thereafter, the desired reaction product can be obtained by pouring the solution of the reaction mixture into a non-solvent, such as methanol for the reaction product, or in some instances into water, and isolating the reaction product by filtration or by separation if a two-phase system is obtained.

In order that those skilled in the art may better understand how the present invention may be practiced, the following examples are given by way of illustration and not by way of limitation. All parts are by weight unless otherwise indicated. In the following examples, the reactions were carried out in a reaction vessel equipped with a stirrer, condenser, and nitrogen inlet through which a nitrogen blanket was established in the reaction chamber. Throughout the reaction, the mixture was stirred constantly while at the same time removing all evolving hydrogen halide through the condenser if this was a by-product of the reaction.

EXAMPLE 1

In this example, 4.56 parts 4,4'-dihydroxydiphenylmethane and 9.4 parts p-maleimidobenzoylchloride in a molar ratio of 1 mol of the former to 2 mols of the latter, and 30 parts tetrachloroethane were mixed together and stirred and heated at 150° to 155° C. for about 1½ hours until HCl ceased to evolve. The reaction mixture was then cooled and the product was precipitated by addition to methanol. The precipitated solid product which resulted was filtered and dried at 90° C./20 mm. (Hg) for about 18 hours to yield a product having the formula XIII 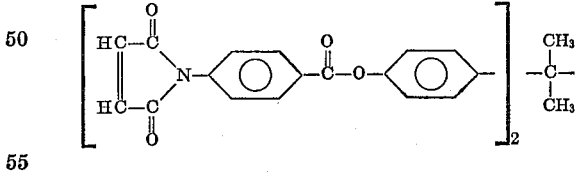

Evidence of this product was established by the analyses which were as follows: Theoretical (percent): C, 71.0; H, 4.16; N, 4.16. Found (percent): C, 68.5; H, 4.10; N, 4.15.

EXAMPLE 2

In this example, 9.4 parts p-maleimidobenzoyl-chloride, 9.72 parts p-tetrahydrophthalimidophenol in a molar ratio of 1 mol of the former to 1 mol of the latter and 48 parts tetrachloroethane were mixed together and the mixture was stirred and heated at 155° C. for about 2 hours essentially until all HCl had evolved. The mixture was then cooled to form a precipitate which was removed by filtration. The filtrate was poured into methanol which in turn precipitated more solid product which was then added to the filtered solid. The combined mixture was dried at 90° C./20 mm. (Hg) for about 18 hours to give a solid product which, although not having a melting point (it was soluble in methylene chloride), when heated in air at about 200 to 250° C., yielded a thermoset product. This compound was found to have the formula XIV
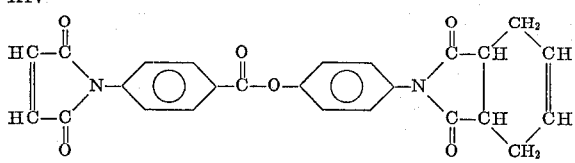

as evidenced by the following analyses: Theoretical (percent): C, 68.2; H, 3.74; N, 6.36. Found (percent): C, 67.0; H, 4.1; N, 6.05.

EXAMPLE 3

In this example, 5.12 parts 2,6-xylenol sulfone of the formula

XV
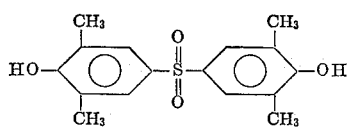

and 9.4 grams p-maleimidobenzoyl chloride in the molar ratio of 1 mol of the former to 2 mols of the latter were mixed with 30 parts tetrachloroethane and the mixture was stirred and heated at 155° C. for 6 hours until essentially all HCl was evolved. The mixture was then cooled and the product precipitated in methanol as in the preceding examples, and the precipitate was filtered and dried at 80° C./20 mm. (Hg) for about 18 hours. This composition was found to have the formula XVI
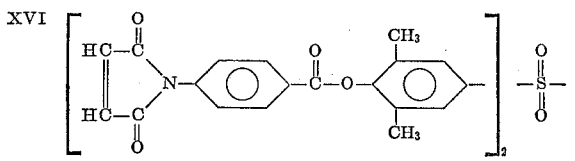

as evidenced by the analyses which were as follows: Theoretical (percent): C, 64.7; H, 3.98; N, 3.98. Found (percent): C, 64.7; H, 4.0; N, 3.84.

EXAMPLE 4

5.1 parts isophthaloyl chloride and 12.1 parts p-tetrahydrophthalimidophenol (in a molar ratio of 1 mol of the former to 2 mols of the latter) were mixed with 60 parts of chlorinated diphenyl oxide and the mixture was heated and stirred under nitrogen for 3 hours at 300° C. The product was cooled, diluted with an equal volume of $CH_2Cl_2$, and precipitated with methanol as in the preceding examples. The solid precipitate was filtered and dried in air, dissolved again in methylene chloride, reprecipitated with methanol and dried in vacuum at 70° C. to yield the composition XVII
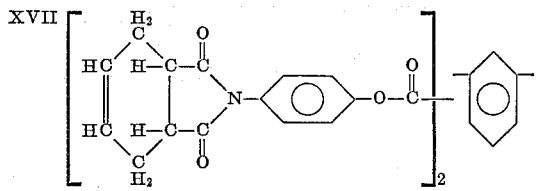

Upon heating in air at 250° C. for 10 minutes, the material became rubbery and insoluble in methylene chloride. The following analyses identified this composition: Theoretical (percent): C, 70.2; H, 4.55; N, 4.55. Found (percent): C, 70.5; H, 4.53; N, 4.41.

EXAMPLE 5

48 grams (0.2 mol) p-tetrahydrophthalimidophenol, dissolved n 150 ml. methylene chloride and an amount of pyridine sufficient to effect solution of the aforesaid phenol, were charged to a reaction vessel equipped with a stirrer, condenser, and thermometer. Phosgene was admitted into the solution while the latter was stirred; the phosgenation was carried out until the temperature rose to a maximum and then proceeded to drop. This took about 2 hours. The product was precipitated with methanol as in the preceding examples, washed with additional methanol and dried in vacuum at 105° C./20 mm. This yielded a composition having the formula XVIII
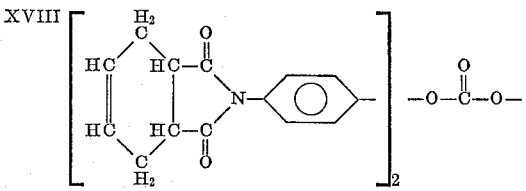

melting at 234–8° C. whose identity was established as evidenced by the following analyses: Theoretical (percent): C, 68.0; H, 4.68; N, 5.48. Found (percent): C, 68.5; H, 4.79; N, 5.61.

Upon heating a sample of the aforesaid bis-imide in air at 250° C. for 10 minutes, the material became strong and rubbery, and insoluble, in methylene chloride.

EXAMPLE 6

18.8 parts p-maleimidobenzoyl chloride, 344. parts piperazine, 80 parts of dry dimethyl formamide, and 4 parts dry pyridine were mixed together under nitrogen and after the temperature of the mixture exothermed to 50° C., it was stirred at room temperature for about one hour and then precipitated by the addition to water. The solid product which precipitated was dried under vacuum at 80° C. to obtain a product which exhibited no melting point even when heated up to 400° C. This composition was identified as having the formula XIX
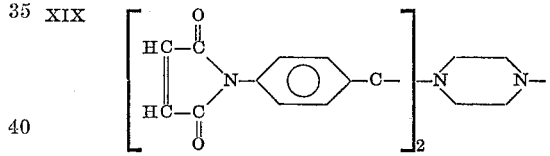

as evidenced by the analysis which was as follows: Theoretical (percent): N, 11.55. Found (percent): N, 11.58.

A solution of the bis-maleimide was made as a 20 percent solids in N-methyl pyrrolidone and then cast on a substrate and heated at 175° C. for one hour in air to give a thermoset film having a cut-through temperature of 249° C. when measured in accordance with the procedure described in U.S. Patent 2,936,296, issued May 10, 1960.

EXAMPLE 7

About 4.4 parts hydroquinone, 18.8 parts p-maleimidobenzoyl chloride, and about 60 parts tetrachloroethane were stirred and heated at the reflux temperature of the mass under nitrogen for about 18 hours, then cooled, the precipitated solid product removed by filtration and dried in vacuum at 80° C. This yielded a product melting at around 200° C. which was identified as having the formula XX
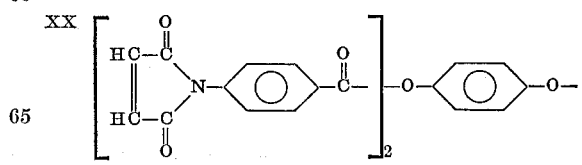

as evidenced by analysis of the composition which was as follows: Theoretical (percent): N, 5.5. Found (percent): N, 5.0.

A film was cast from a warm solution of 20 percent solids solution in N-methyl pyrrolidone containing 5 weight percent dicumyl peroxide, based on the weight of the bismaleimide. The film was heated at 150° C. for one hour and at 200° C. for one-half hour to yield a tough film which had a cut-through temperature of about 355° C.

EXAMPLE 8

The composition having the formula

XXI

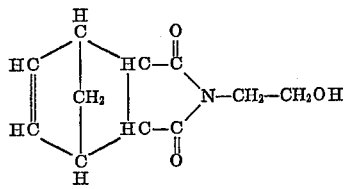

was prepared by reacting endomethylenetetrahydrophthalic anhydride with monoethanolamine in xylene. About 10.35 parts of the compound of Formula XXI and 18 parts dry dimethyl formamide were mixed together and thereafter 4.35 parts tolylene diisocyanate was added slowly while the mixture exothermed to 45° C. The mixture was stirred under nitrogen for one hour at room temperature and then precipitated by adding to water. The solid product which precipitated was filtered and dried in vacuum at 70° C. for about 18 hours to yield an isocyanato compound melting around 98–104° C. and having the formula

XXII

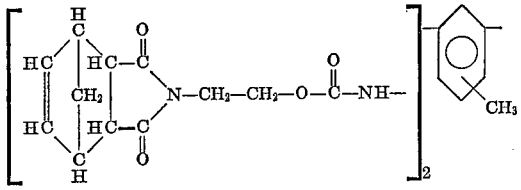

which was identified as such as evidenced by the analyses which were as follows: Theoretical (percent): C, 63.3; H, 5.44; N, 9.53. Found (percent): C, 62.8; H, 5.65; N, 10.0.

A film was cast similarly as in Example 7 on a substrate and heated for about 5 minutes at 300° C. This yielded a thermoset, infusible, insoluble film which showed no evidence of melting even when heated up to 400° C. The film was insoluble in methylene chloride.

EXAMPLE 9

The N-hydroxyphenyl-phthalimide derivative having the formula

XXIII

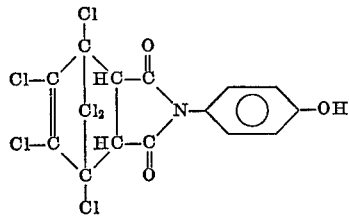

was prepared by effecting reaction between 185.5 parts 1,4,5,6,7,7-hexachlorobicyclo[2.2.1]-5-heptene-2,3 - dicarboxylic anhydride, 54.5 parts p-aminophenol in about 440 parts xylene; after heating the mixture at the reflux temperature of the mass for about 2½ hours, the mixture was cooled and the precipitate which formed was filtered, washed in benzene and dried in vacuum at 80° C. for about 18 hours to yield the above-identified hydroxyphenyl derivative melting at 334–6° C. Thereafter, 46.2 parts of the above-described hydroxyphenyl derivative was placed in a reaction vessel equipped with stirrer, condenser, thermometer, and inlet tube together with about 335 parts methylene chloride and sufficient pyridine to effect complete solution of the composition. While the mixture was stirred, phosgene was admitted slowly through the inlet tube into the solution, and as the temperature arose to maximum of about 42° C., the phosgenation was continued until the temperature dropped to around 38° C., indicating completion of the phosgenation reaction. The product was precipitated by adding it to methanol, filtered and dried, and then redissolved in methylene chloride, reprecipitated with methanol, filtered and dried in vacuum at 80° C. for about 18 hours to give a product having a melting point of about 358–60° C., which was identified as having the formula

XXIV

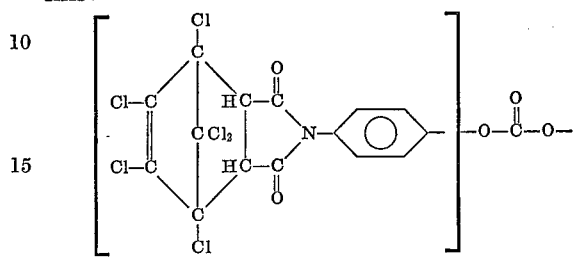

as evidenced by the analyses which were as follows: Theoretical (percent): C, 39.2; H, 1.26; N, 2.94. Found (percent): C, 39.3; H, 1.26; N, 2.8.

The compositions of Formula I can be heated at elevated temperatures to effect polymerization thereof to the cured thermoset, that is, infusible and insoluble (in methylene chloride) state. Generally, the incorporation of a source of free radicals such as an organic peroxide or an azonitrile will accelerate the polymerization so that shorter periods of time and lower temperatures can be employed. Among the sources of free radicals which may be employed are, for instance, organic peroxides, for example, benzoyl peroxide, tertiary butyl perbenzoate, dicumyl peroxide, di-(tertiary butyl)diperphthalate, etc.; azonitriles, for example, azobisisobutyronitrile, etc. Another source of free radicals may be obtained by the use of high energy radiation, such as high energy electrons which can also be employed to effect conversion of the maleimides of Formula I to the infusible and insoluble state without application of heat.

When heat is employed, generally temperatures of the order of from about 100 to 250° C. for times ranging from about 1 minute to 2 hours or more can be used, depending on the particular compound being polymerized, the persence or absence of a source of free radicals, the concentration of such free radical source, etc. When a curing agent is employed for the purpose, it is generally used in an amount equal to about 0.01 to about 5% or more, by weight, based on the weight of the composition undergoing polymerization.

As pointed out previously, the compositions of the present invention can be converted by heat and organic peroxides to the thermoset, infusible and insoluble state. The following example illustrates this.

EXAMPLE 9

Twenty parts of the maleimide compound of Example 3, Formula XV, was dissolved in 80 parts N-methyl-2-pyrrolidone together with 0.4 part dicumyl peroxide. The solution was then cast on a substrate and the film cured at 120° C. for 1 hours, 200° C. for 1 hour, and 250° C. for 1 hour. There was thus obtained a cured thermoset film which was self-supporting and had a cut-through temperature of 370° C.

In addition to the homopolymerization of the imido compositions of the present invention, they may also be polymerized with other copolymerizable olefinic monomers containing at least one $CH_2=C<$ groupings (e.g., from 1 to 3 such groupings) wherein the copolymerizable monomer comprises a positive amount ranging, by weight, in an amount equal to 0.01 to 3 parts of the copolymerizable monomer per part of the imido composition. Included among such vinyl monomers may be mentioned, for instance, vinyl chloride; isobutylene, butadiene, isoprene, chlorotrifluoroethylene; 2-methylpentene-1; vinyl esters of organic carboxylic acid such as vinyl formate, vinyl acetate; acrylonitrile, styrene, vinyl methyl ether, vinyl methyl ketone; acrylic esters, such as methyl-, ethyl-, butyl-, etc., esters of acrylic and methacrylic acids, etc.; diallyl phthalate, divinyl benzene, triallyl citrate, triallyl cyanurate, N-vinyl maleimide, N-vinyl phthalimide, N-allyl phthalimide, N-allyl tetrachlorophthalimide, etc. When copolymerizing the imido composition of Formula I with the olefinic monomers, the copolymerization may take place in the presence or absence of a source of free radicals. The following example shows such copolymerization.

EXAMPLE 10

In this example, 50 parts of the imido composition of Formula XV and 50 parts each of styrene, diallyl phthalate, and N-phenylmaleimide, each formulation dissolved in about 100 parts N-methyl-2-pyrrolidone together with 2 parts benzoyl peroxide, were formed into solutions and the solutions were cast on a substrate and heated for about 30 minutes while raising the temperature gradually from 100 to 250° C. In each instance, an insoluble (in methylene chloride) and infusible film was obtained which did not melt even when heated up to 300° C.

In addition to the copolymerizations referred to above, it is also possible to coreact the imido compositions of Formula I, with other polymers and resins in amounts ranging from 1 to 50% or more, by weight, of the resign or polymer, based on the total weight of all the ingredients undergoing polymerization. Included among such polymers may be mentioned polyolefins (e.g., polyethylene, polypropylene, etc.) polystyrene, polyphenylene oxides such as shown in U.S. 3,306,875, epoxy resins, polycarbonate resinssuch as shown in U.S. 3,028,365, silicone resins, phenol-aldehyde resins, polyimide resins such as shown in U.S. 3,179,633–634, polyarylene polyethers such as shown in U.S. 3,332,909, etc., many of which are well known in the art. The following examples illustrate the preparation of such products.

EXAMPLE 11

In this example, polyvinyl chloride was compounded with the maleimido sulfone of Example 3 in the presence of a plasticizer for polyvinyl chloride, di-(isodecyl) phthalate, and tribasic lead maleate as a stabilizer for the polyvinyl chloride. The mixture of ingredients was cured with dicumyl peroxide at 165° C., for 5 minutes at 5000 p.s.i. into the form of a sheet and the sheet was then tested for tensile strength and percent elongation at 100° C. For comparison, a similar sample was molded, omitting the maleimido sulfone. The following Table I shows the two formulations and the results of the tests on the molded samples.

TABLE I

| | Sample A | Sample B |
|---|---|---|
| Ingredients: | | |
| Polyvinyl chloride, parts | 50 | 50 |
| Di-(isodecyl) phthalate, parts | 5 | 5 |
| Maleimido sulfone, parts | 5 | |
| Tribasic lead maleate, parts | 5 | 5 |
| Dicumyl peroxide, parts | 1 | 1 |
| Properties: | | |
| Tensile, p.s.i. at 100° C | 1,020 | 540 |
| Percent elongation at 100° C | 190 | 260 |

EXAMPLE 12

In this example, a polymer of acrylonitrile, butadiene, and styrene known as Lustran 220, manufactured by Monsanto Chemical Co. was mixed with the same maleimide sulfone as used in the preceding Example 11, and employing the same plasticizer and organic peroxide curing agent.

After compounding the ingredients, they were molded under the same conditions as in Example 11 and tested for tensile strength and percent elongation at 100° C.

The following Table II shows the two formulations employed and the test results.

TABLE II

| | Sample A | Sample B |
|---|---|---|
| Ingredients: | | |
| Lustran 220, parts | 50 | 50 |
| Di-(isodecyl)phthalate, parts | 5 | 5 |
| Maleimido sulfone, parts | 5 | |
| Dicumyl peroxide, parts | 1 | 1 |
| Properties: | | |
| Tensile, p.s.i. at 100° C | 350 | 120 |
| Percent elongation at 100° C | 210 | 460 |

The imido compositions of Formula I can also be co-reacted and copolymerized with heat, preferably in the presence of an organic peroxide, with monoimides of the formula XXV 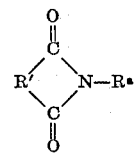

and bis-imides of the general formula

XXVI 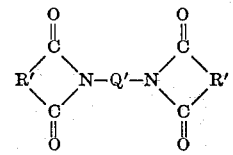

where $R^a$ is a member of the class consisting of hydrogen, monovalent organic radicals (e.g., monovalent hydrocarbon radicals, etc.) and the

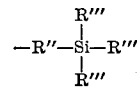

radical, R'' is a divalent hydrocarbon radical of from 1 to 10 carbon atoms, R''' is a monovalent hydrocarbon radical of from 1 to 10 carbon atoms, R' is a member selected from the class consisting of radicals represented by Formulas II, III and IV, Q' is a member selected from the class consisting of divalent organic radicals of at least 2 carbon atoms including but not limited to divalent hydrocarbon radicals of from 2 to 10 carbon atoms and divalent groups consisting of two aryl residues attached to each other through the medium of a member selected from the class consisting of an alkylene radical of from 1 to 10, e.g., 1 to 3, carbon atoms,

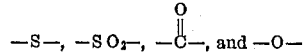

Such mono- and bis-imides are more particularly described in the copending application of Fred F. Holub and Denis R. Pauzé, Ser. No. 819,445, filed Apr. 25, 1969 and assigned to the same assignee as the present invention. By reference, the disclosures of the latter application are made part of the disclosures of the instant application.

The compositions of the present invention have application in a wide variety of physical shapes and form, including the use as films, molding compound, etc. The unusual heat stability and resistance to deformation at elevated temperature, while at the same time retaining their properties at elevated temperatures in the cured state, makes these compositions especially unique. When used as films or when made into molded products, these polymers, including the laminated products prepared therefrom not only possess excellent physical properties at room temperature but they retain their strength and excellent response to workloading at elevated temperatures for long periods of time. The fact that they have high decomposition points, well above 400° C., and in some instances above 500° C., indicates a wide range of commercial utility for these products. These polymers in particular resist fusion when exposed to temperatures of 400 to 500° C. for extended periods of times while still retaining an exceptionally high proportion of their room temperature physical properties. The ability to make fusible or soluble precursors of the finally cured products makes them especially suitable in the preparation of shaped articles such as films, molded products, etc., whereby using conventional techniques, the mixture of copolymerized ingredients can be converted in situ to the finally cured, and infusible, and insoluble state.

Films formed from the polymeric compositions of this invention may be used in applications where films have been used previously and in addition film therefrom can be used in applications where films in the past have not been especially suitable. They serve effectively in an extensive variety of wrapping, packaging and bundling applications. Thus, the compositions of the present invention can be used in automobile and aviation applications for decorative and protective purposes, and as high temperature electrical insulation for motor slot liners, in transformers, as dielectric capacitors, as coil and cable wrappings (form wound coil insulation for motors), for packaging items to be exposed to high temperatures or to corrosive atmospheres, in corrosion-resistant pipes and duct work, for containers and container linings; in laminating structures where films of the present composition or where solutions of the claimed compositions of matter are applied to various heat-resistant or other type of materials such as asbestos, mica, glass fiber and the like and superposing the sheets one upon the other and thereafter subjecting them to elevated temperatures and pressures to effect flow and cure of the resinous binder to yield cohesive laminated structures.

Films made from these compositions of matter can serve in printed circuit applications, for instance, as backings by coating the films made from such compositions with a thin layer of copper or aluminum either by coating the metal with the curable or heat-convertible compositions herein described and then by heating at elevated temperatures to convert the product to the completely cured stated, or by laminating a metal sheet to the cured resinous composition. The circuit design is then covered by a protective coating and the extra metal is etched off followed by washing to prevent further etching. An advantage of making such circuit boards is that the base film is stable to heat so that it can be connected to other components by a dip soldering technique while in contact with the other components without adversely affecting the resinous support base.

Alternatively, solutions of the curable compositions herein described can be coated on electrical conductors such as copper, aluminum, etc., and thereafter the coated conductor can be heated at elevated temperatures to remove the solvent and to effect curing of the resinous composition thereon. If desired, an additional overcoat may be applied to such insulated conductors including the use of polymeric coatings, such as polyamides, polyesters, silicones, polyvinylformal resins, epoxy resins, polyimides, polytetrafluoroethylene, etc. The use of the curable compositions of the present invention as overcoating on other types of insulation is not precluded.

Applications which recommend these resins include their use as binders for asbestos fibers, carbon fibers, and other fibrous materials in making brakelinings. In addition, grinding wheels and other abrasive articles can be made from such resins by incorporating abrasive grains such as Alundum, Carborundum, diamond dust and particles, etc., and shaping or molding the mixture under heat and pressure to obtain the desired configuration and shape for grinding and abrasive purposes.

In addition, molding compositions and molded articles may be formed from the polymeric compositions in this invention by incorporating such fillers as asbestos, glass fibers, talc, quartz powder, wood flour, finely divided carbon, silica, into such compositions prior to molding. Shaped articles are formed under heat, or under heat and pressure in accordance with practices well-known in the art. In addition, various heat-resistant pigments and dyes may be incorporated as well as various types of inhibitors depending on the application intended. So-called resistance or semiconducting paints may also be made from the compositions by incorporating in solutions or dispersions of the curable polymeric mixture, controlled amounts of conducting materials such as carbon, silicon carbide, powdered metal, conducting oxides, etc., in order to impart to the cured paint the particular degree of resistance or semiconduction.

Among the specific applications for which the compositions herein defined may be employed include as finishes for the interiors of ovens, clothing driers, as finishes for cooking utensils, muffler liners, liners for high temperature equipment including liners for hot water heaters, as protective coatings for fragile or brittle substrates such as protective coatings for high temperature bulbs, glass equipment, etc., as flame-retardant paints, as belting for use in high temperature conveyors, etc.

The compositions herein defined may suitably be incorporated in other materials to modify the properties of the latter or in turn their properties may be modified by the incorporation of the other material. For example, they may be compounded with substances such as natural or synthetic rubbers; synthetic resins such as phenyl-aldehyde resins, urea-aldehyde resins, alkyd resins, etc.; cellulosic material such as paper, inorganic and organic esters of cellulose such as cellulose acetate, cellulose ethers, such as methyl cellulose, ethyl celluose, benzyl celluose, etc. In some instances, plasticizers and other modifying agents may be used in combination therewith to yield products which when applied to a base member and air dried or baked have a high degree of heat-resistnace due to the presence of the compositions herein defined.

It will of course be apparent to those skilled in the art that in addition to the compositions specifically referred to in the foregoing examples, other bis-imides coming within the scope of Formula I, many examples of which have been described previously, may be prepared and employed without departing from the scope of the invention. In addition other copolymerizable monomers containing at least one $CH_2=C<$ grouping or other polymers, again many examples of which have been given previously, may be used within the scope of the invention. Other peroxides, and cure accelerating agents may be employed and obviously, the conditions for making the compositions of Formula I and for polymerization and copolymerization, and cure may be varied within wide limits.

What we claim as new and desire to secure by Letters Patent of the United States is:

1. A heat-curable composition of matter comprising (a) a compound corresponding to the general formula

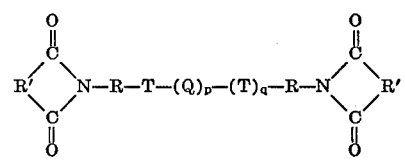

where R is a divalent hydrocarbon radical of from 1 to 20 carbon atoms, R' is a member selected from the class consisting of the

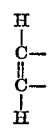

and

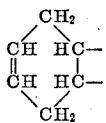

groupings, T is a member of the groupings

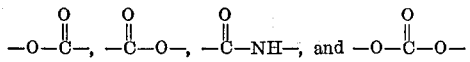

Q is a divalent organic radical selected from the group consisting of aromatic, cycloaliphatic, and heterocyclic radicals, and a radical of the formula —R″—Z—R″—, where R″ is a phenylene radical unsubstituted or substituted with two methyl radicals and Z is a divalent group of the class of alkylene radicals of from 1 to 6 carbon atoms,

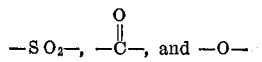

where $p$ is equal to 1 and $q$ is equal to 0 or 1, and (b) polyvinyl chloride resin.

2. A composition of matter as in claim 1 containing an organic peroxide cure accelerator for the mixture of (a) and (b).

3. The heat-treated product of claim 2.

References Cited
UNITED STATES PATENTS

| | | | |
|---|---|---|---|
| 2,850,351 | 9/1958 | Moore et al. | 8—127.6 |
| 2,958,672 | 11/1960 | Goldberg | 260—884 |
| 2,745,841 | 5/1956 | Tawney | 260—326.3 |
| 2,971,944 | 2/1961 | Chow et al. | 260—78 |
| 3,627,780 | 12/1971 | Bonnard et al. | 260—326.3 |

MURRAY TILLMAN, Primary Examiner

J. SEIBERT, Assistant Examiner

U.S. Cl. X.R.

51—298; 117—71 M, 75, 126 R, 126 AB, 126 GB, 126 GE, 126 GS, 161 R, 161 A, 161 P, 161 UN, 132 R, 132 B, 132 BE, 132 BF, 132 BS, 132 CB, 217, 218; 204—159.16; 260—4 R, 4 AR, 5, 17 R, 17.4 R, 17.4 BB, 41 R, 41A, 41 AG, 47 UA, 47 CB, 49, 78 UA, 326.3, 827, 836, 844, 846, 857 G, 873, 874, 875, 876 R, 878 R, 879